United States Patent [19]

Henager, Jr. et al.

[11] Patent Number: 5,462,902

[45] Date of Patent: Oct. 31, 1995

[54] PROCESS FOR PRODUCING DISPERSED PARTICULATE COMPOSITE MATERIALS

[75] Inventors: Charles H. Henager, Jr., Richland, Wash.; John P. Hirth, Viola, Id.

[73] Assignee: Battelle Memorial Institute, Richlands, Wash.

[21] Appl. No.: 150,453

[22] Filed: Nov. 9, 1993

Related U.S. Application Data

[63] Continuation-in-part of Ser. No. 781,021, Oct. 18, 1991, abandoned.

[51] Int. Cl.⁶ .................................................. C04B 35/573
[52] U.S. Cl. ........................... 501/92; 501/87; 501/88; 501/94; 427/376.2; 427/376.3
[58] Field of Search .............................. 501/87, 96, 94, 501/92, 88, 154, 93; 156/60, 62.2; 264/65, 60; 427/376.2, 376.3

[56] References Cited

U.S. PATENT DOCUMENTS

| | | | |
|---|---|---|---|
| 3,481,854 | 12/1969 | Lane | 204/192 |
| 3,563,873 | 2/1971 | Beyer | 204/192 |
| 3,644,188 | 2/1972 | Sharp | 204/192 |
| 3,809,627 | 5/1974 | Sharp | 204/37 R |
| 4,010,312 | 3/1977 | Pinch | 428/450 |
| 4,071,426 | 1/1978 | Pinch | 204/192 |
| 4,419,161 | 12/1983 | Hailey | 501/96 |
| 4,454,015 | 6/1984 | Ray | 204/293 |
| 4,465,577 | 8/1984 | Tanielian | 204/192 |
| 4,698,319 | 10/1987 | Ray | 501/96 |
| 4,717,692 | 1/1988 | Ray | 501/87 |

OTHER PUBLICATIONS

*Websters II New Riverside University Dictionary*, Riverside Publishing Company (1984) p. 639.

Primary Examiner—Karl Group
Assistant Examiner—Paul Marcantoni
Attorney, Agent, or Firm—Marger Johnson McCollom & Stolowitz

[57] ABSTRACT

This invention is directed to a process for forming noninterwoven dispersed particulate composite products. In one case a composite multi-layer film product comprises a substantially noninterwoven multi-layer film having a plurality of discrete layers. This noninterwoven film comprises at least one discrete layer of a first material and at least one discrete layer of a second material. In another case the first and second materials are blended together with each other. In either case, the first material comprises a metalloid and the second material a metal compound. At least one component of a first material in one discrete layer undergoes a solid state displacement reaction with at least one component of a second material thereby producing the requisite noninterwoven composite film product. Preferably, the first material comprises silicon, the second material comprises $Mo_2C$, the third material comprises SiC and the fourth material comprises $MoSi_2$.

21 Claims, 3 Drawing Sheets

PROCESS FOR PRODUCING DISPERSED PARTICULATE COMPOSITE MATERIALS

BACKGROUND OF INVENTION

This application is a continuation-in-part of U.S. Ser. No. 07/781,021, filed on Oct. 18, 1991, now abandoned.

In U.S. Pat. No. 4,454,015, an anode electrode composition having an improved electrical conductivity is provided by contacting a combination of metallic and metallic-oxides, oxygen-containing compounds, and an elevated temperature resulting in a displacement reaction to form an interwoven network of metal oxides and metal alloy. Metal oxides include oxyborides, oxynitrides, and oxyhalides. Metal borides, nitrides, carbides, halide and sulfides are also said to be within the term metal compounds. In U.S. Pat. No. 4,465,577, cermet films are formed which include a substrate and multiple, ultra-thin alternating layers of conductive and non-conductive material on the substrate. The layers are created using RF sputtering techniques to form alternating layers of discontinuous island of particles from each of the different materials. Each of layers is on order of 20-50 angstroms thick. The substrate is silicon, silicon dioxide or aluminum trioxide. In examples of the cermet layers are alternating layers of silicon dioxide in either gold or chromium.

Solid state displacement reactions are diffusional phase transformations whereby two or more elements or compounds react to form new product compounds that are more thermodynamically stable than the starting reactants. Prior art interwoven microstructures can be achieved using displacement reactions. This particular work grew out of studies on displacement reactions involving Ni/CuO$_2$, Ni/NiO, Co/Cu$_2$O, Fe/Cu$_2$O, Fe/NiO (See References 1–4 below). Others, such as provided in References 5–14 below, have used a related approach termed reaction sintering as a route to ceramic composites. However, this has met with limited success in producing high quality structural materials due to the lack of predictability and understanding of reaction mechanisms and reaction morphologies (see References 3, 15, 16 below). It is difficult to understand the formation kinetics for these solid state displacement reactions. For any specific set of potential reactants one cannot predict with certainty the ability and extent of the displacement reaction due to a lack of critical materials data required for making that determination.

References

1. R. A. Rapp, A. Ezis and G. J. Yurek, Met. Trans 4, 1283 (1973).
2. G. J. Yurek, R.a. Rapp and J. P. Hirth, Met. Trans. 4, 1293 (1973).
3. G. J. Yurek, R. A. Rapp and J. P. Hirth, Met. Trans. 10A, 1473 (1979).
4. C. Tangchitvittaya, J. P. Hirth and R. A. Rapp, Met. Trans. 13A, 585 (1982).
5. J. S. Haggerty and U. M. Chiang, Ceram. Eng. Sci. Proc. 11 (7 8)757 (19 90).
6. N. Claussen and J. Jahn, J. Amer. Ceram, Soc. 63, 228 (1980).
7. M. R. Ansedau, C. Leblud, F. Cambier, J. Mater. Sci. Lett. 2, 366 (1983).
8. S. Yangyun and R. J. Brook, Ceram, Int. 9, 39 (1985)
9. P. Boch and J. P. Giry, Mater, Sci., and Eng. 71, 39 (1985)
10. A. Mocellin and G. Bayer, J. Mater, Sci. 20 3691 (1985)
11. P. Pena, P. Miranza, J. S. Moya and S. DeAza, J. Mater. Sci. 20, 2011 (1985).
12. P. Miranza, P. Pena, J. S. Moya and S. De Aza, J. Mater. Sci, 20, 2702 (1985).
13. G. Bayer and A. Mocellin, Rev. Chimie Miner, 23, 80 (1986).
14. P. Miranza, P. Pena, S. DeA.a, J. S. Moya, J. MaRincon, and G. Thomas, J. Mater Sci, 22, 2987 (1985).
15. M. Martin and H. Schmalzried, Ber. Bunsenges. Phys. Chem, 89, 124 (1985).
16. M. Ackhaus-Ricoult and H. Schmaizried, Bayer. Bunsenges, Phys. Chem. 89 1323 (1985).
17. R. D. Doherty, Physical Metallurgy, 3rd edition. R. W. Cahn and P. Haasen, eds., p. 933, North-Holland, New York (1983).
18. E. W. Lee, J. Cook. A. Khan, R. Mahapatra, and J. Waldman, J. of Metals 3, 54 (1991).
19. E. J. J. Vanloo, F. M. Smet, G.d. Rieck, and G. Verspui, High Temp.-High Press. 14, 25 (1982).
20. D. II. Carter. W. S. Gibbs, and J. J. Petrovic, Ceramic Materials and Components for Engines, V. J. Tennery, ed., p. 977, the American Ceramic Society, Westerville, Ohio (1989).

SUMMARY OF THE INVENTION

This invention relates to a process for forming a substantially noninterwoven dispersed particulate composite material.

In the case of a dispersed particulate composite multi-layer product, a substantially noninterwoven multi-layer structure is first formed having a plurality of discrete layers. This noninterwoven film comprises at least one discrete layer of a first material and at least one discrete layer of a second material. Typically, the first material comprises a metalloid compound, preferably silicon, and second material comprises a metal compound, such as Mo$_2$C.

These first and second materials preferably have an average particle size of not more than about one micron, more preferably not more than about 0.75 microns, and most preferably not more than about 0.50 microns. This small particle size and the close proximity of the first and second layers minimizes the diffusion length and controls the composite phase separation distance so that a solid state displacement reaction can effectively and efficiently occur. The typical thickness of the layers of the first and second material is not more than about 5.0 microns, preferably not more than about 3.0 microns, and more preferably not more than about 1.0 microns.

The discrete layers of the dispersed particulate composite, which are substantially unreactive with each other at ambient temperature, are preferably arranged in alternating adjacent layers. The materials in these alternating adjacent layers undergo a solid state displacement reaction to form a multi-component third material and a multi-component fourth material in which particles of the third material are dispersed within a matrix of the fourth material, thereby producing said composite product.

In order to effect the solid state displacement reaction of the present invention, at least one of the first material or second material should have a multi-component structure. A multi-component structure means that the material includes at least two chemical elements. Examples of such multi-component structures are $Mo_2C$ and $B_4C$.

A specific reaction involving the subject process can relate to a first material comprising silicon, a second material comprising $Mo_2C$, forming third and fourth materials comprising SiC and $MoSi_2$. The solid state displacement reaction can comprise the following chemical equation:

$$Mo_2C + 5Si \rightarrow 2MoSi_2 + SiC$$

Another reaction involving the subject process relates to first material comprising titanium, a second material comprising $B_4C$, and the production of a product comprising $TiB_2$ and TiC. This solid state displacement reaction comprises the following chemical equation:

$$3Ti + B_4C \rightarrow 2TiB_2 + TiC$$

Preferably, as evidenced by the above solid state displacement reactions, the process of this invention can comprise reactants wherein neither of the first and second materials are oxygen-containing.

This process also contemplates solid displacement reactions in which the first material comprises $Ni_2Al_3$, the second material comprises NiO, and the third and fourth materials product comprises $Al_2O_3$ and $NiAl_2O_4$, as well as reactions in which the first material comprises sapphrine ($4MgO.5Al_2O_3.2SiO_2$), the second material comprises alumina ($Al_2O_3$), and the thin ceramic-containing composite film product comprises mullite ($2SiO_2.3AlO_3$) and spinel ($MgAl_2O_4$).

The noninterwoven dispersed particulate composite material is then heated to a temperature wherein at least one component of a first material undergoes a solid state displacement reaction with at least one component of a second material. In this way, the composite product is formed.

In the process of present invention it is preferred that the particles of the third material comprise platelets and more specifically that the particles of the third material are uniformly distributed throughout the fourth material. Moreover, it is also preferred that the first material and the second material interdiffuse, and the alignment of said particles of the third material with respect to the fourth material is in the direction of said interdiffusion of the first and second material. Typically, the first material and the second material comprise a diffusion couple. Finally, the first material and the second material can comprise powders which are formed into said discrete layers.

In another form of this invention, the process for forming a substantially noninterwoven composite product comprises blending together a first powder material comprising a metalloid compound and a second powder material comprising a metal compound to form a blended powder as described above. The blended powder is heated wherein at least one component of a first material and at least one component of a second material undergoes a solid state displacement reaction to form particles of a third material and a fourth material. As before, these particles of the third material are dispersed within a matrix of the fourth material to produce the substantially noninterwoven dispersed particulate composite product.

The foregoing and other objects, features and advantages of the invention will become more readily apparent from the following detailed description of a preferred embodiment of the invention which proceeds with reference to the accompanying drawings.

DETAILED DESCRIPTION OF PREFERRED EMBODIMENTS

Solid state displacement reactions can produce in situ intermetallic matrix composites in a process where an intermetallic phase(s) and a potential reinforcing phase(s) are grown together during a solid state reaction. Dispersed microstructures, important for desirable dispersed particulate composite properties, have been produced by means of displacement reaction processing techniques. Such composites are $MoSi_2$ reinforced with SiC particles. Strength in bending and chevron-notch fracture toughness have been determined as a function of temperature and measured properties compare favorably with composites produced by other means.

EXAMPLE 1

Dispersed particulate composite materials were formed employing the process of the present invention.

Vacuum hot-pressed $Mo_2C$ (99.5% purity) and pieces cut from Si single crystal wafers (99.99% purity) were used for the diffusion couples. Diffusion couples were prepared using cut and polished pieces roughly 0.5×0.5 cm² and 0.3 cm thick. Several couples were made using Si pieces only 0.025 cm thick. These were placed in a Mo holder with pieces of $Al_2O_3$ and Mo foil. The thermal expansion of this material sandwich in the holder was used to hold the $Mo_2C$ and Si pieces in contact at elevated temperatures. The couples were heated in a vacuum furnace operated at pressures less than $10^{-6}$ torr.

Powders of $Mo_2C$ (−335 mesh, 99+% purity) and Si (−335 mesh, 99.99% purity) were used for the vacuum hot-pressed materials. The powders were blended in a 5:1 Si:$Mo_2C$ ratio using a vibratory ball mixer and hot-pressed at 27.5 MPa using graphite dies under a vacuum of about $10^{-4}$ torr. The hot-pressing temperature cycle was 1350° C. for 2 hours followed by 1 hour at 1700° C. A hot-press die diameter of 2.2 cm was used with 10 to 15 grams of blended powders for the specimens produced here.

Diffusion couples were reacted at 1200° C. for 16 hours and at 1350° C. for 20 hours. The reaction at 1200° C. produced an interesting microstructure of SiC ribbons in a $MoSi_2$ matrix (FIG. 1). The following displacement reaction occurred:

$$Mo_2C + 5Si \rightarrow 2MoSi_2 + SiC$$

Figure 1A:
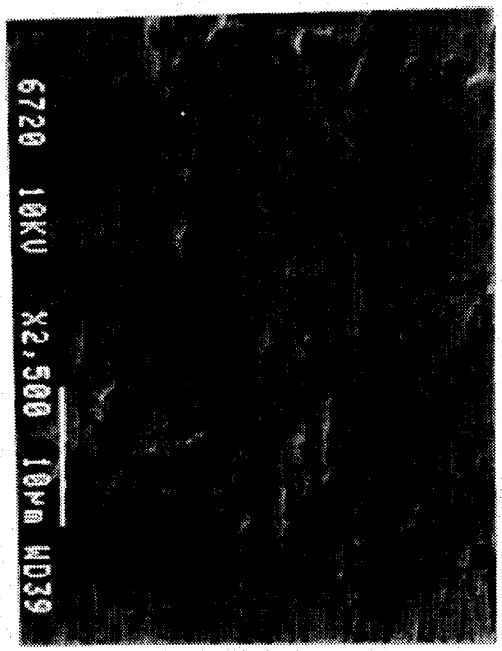
FIG. 1a is a cross section view of reaction zone of $Mo_2C$ and Si diffusion couple after 16 hours at 1200° C.
Figure 1B:
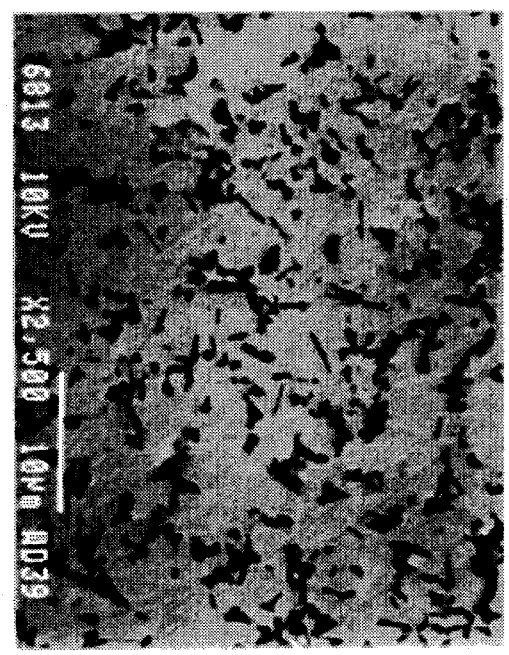
FIG. 1b is a cross section view normal to view of SiC platelets in $MoSi_2$ matrix.

The areal fraction of the SiC particles was determined to be 30%. Although the SiC lamellae exhibit a rod-like appearance in this view, the basic shape is more ribbon-like (FIG. 1a). FIG. 1b shows the microstructure from a section in which the original interface is parallel to the paper. The narrow dimension of the SiC particles was less than 1 micron and they had a length of 10 microns. Some of the lamellae appear to be blocky particles but this could be a result of cutting the ribbon-like lamellae at an angle and thereby increasing the effective dimensions. The diffusion couple reacted at 1350° C. revealed similar microstructures except that indications of spheroidizing of the SiC particles were observed.

Scanning electron microscopy (SEM) was performed for phase and morphology identification. Energy dispersive X-ray (EDX) analysis showed no indication of Mo in the SiC, at least to the accuracy of the analysis. There was also no indication of carbon in the $MoSi_2$; however, the EDX analysis for carbon is not very sensitive. In SiC, which is 50% carbon, the carbon peak is very small.

Figure 2:
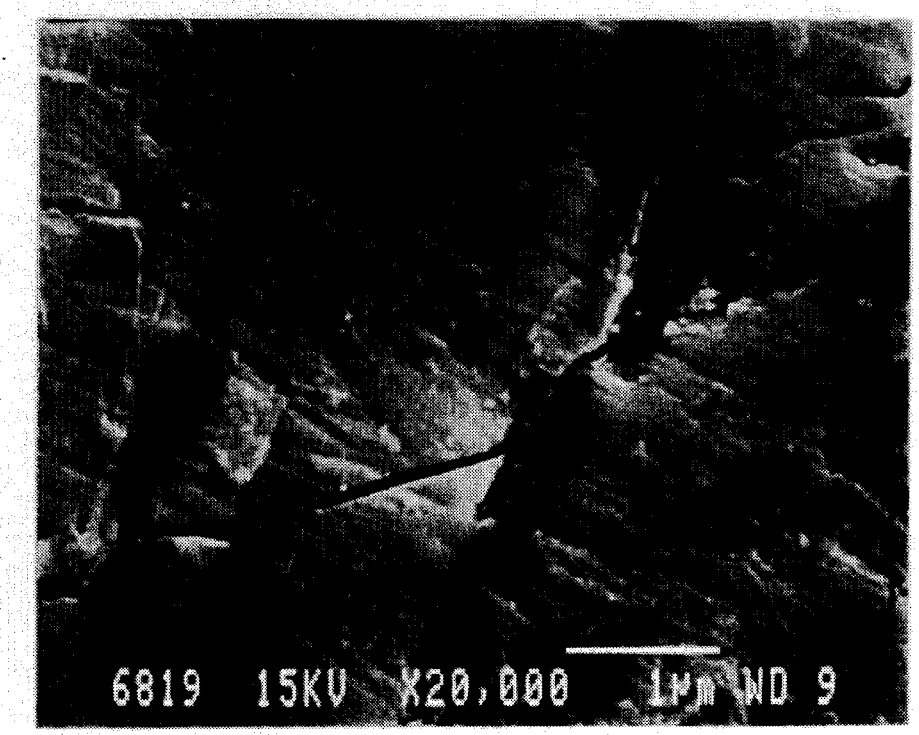
FIG. 2 is a typical interaction of cracks with SiC lamellae in the $MoSi_2$/SiC composite.

Microhardness indents were used to determine the hardness and crack propagation behavior of this material. Cracking was observed around the hardness indent but was not typical of classically brittle behavior. There was rubblelizing at the indent rather than single cracks emanating from the indent corners as would be expected for a brittle ceramic. There were indications of crack deflection at the SiC lamellae and crack wake-bridging (FIG. 2) that are quite similar in appearance to whisker reinforced ceramic materials. The microhardness was 1292 $HV_{1000}$ (12.8 GPa) in the reacted region.

Figure 3A:
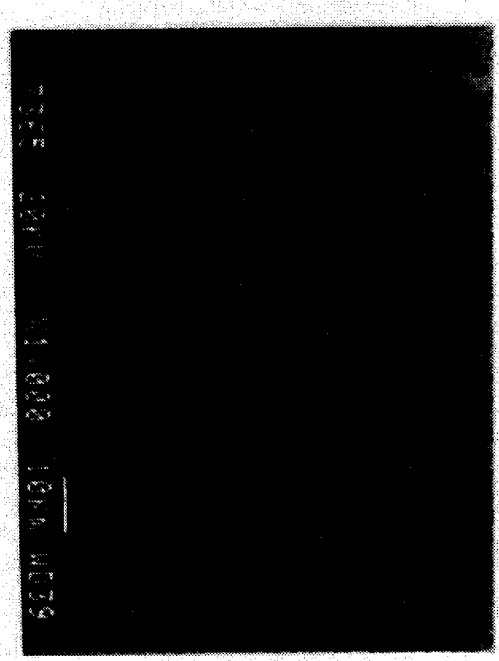
FIG. 3a are SEM micrographs of $MoSi_2$/SiC composite produced by hot-pressing blended powders at 1350° for 2 hours followed by 1 hour at 1700° C. showing low magnification photo showing uniform SiC dispersion and SiC size dispersion.
Figure 3B:
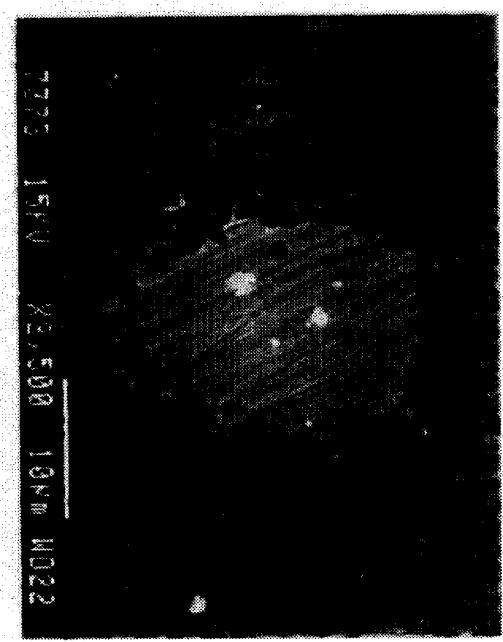
FIG. 3b are SEM micrographs of $MoSi_2$/SiC composite produced by hot-pressing blended powders at 1350° for 2 hours followed by 1 hour at 1700° C. showing higher magnification photo showing $Mo_5Si_3$ inclusions.

Composites fabricated from the blended powders and hot-pressing using the schedule of 2 hours at 1350° C. and 1 hour at 1700° C. were similar to those produced in the diffusion couples with the exception of the morphology of the SiC phase (FIG. 3a) and of the observation of $Mo_5Si_3$ regions (FIG. 3b), which were identified using EDX. The SiC particles were more equiaxed, most likely due to spheroidization of the platelets, but were uniformly distributed throughout the material. Larger regions, up to 20 μm in diameter, of $Mo_5Si_3$ are dispersed throughout the material. Xray diffraction (XRD) reveals strong $MoSi_2$ peaks, SiC as a second phase, and some very faint peaks that could not be indexed but likely belong to the $Mo_5Si_3$ identified in the SLM analysis. The SiC particles are smaller than 1 μm in diameter.

The composite appeared to be near full density from observing polished surfaces in the SEM. The density was measured to be 5.53 g/cm[1]. An estimated theoretical density for a $MoSi_2$/SiC (30 vol % SiC) composite is 5.35 g/cm$^3$. A hardness of 1440±12 $HV_{1000}$ (14.2±0.1 GPa) was measured and an indentation fracture toughness of 8.7±0.1 MPa√m was calculated for this composite using the observed median cracking under 15 kg Knoop indents. The cracking pattern was irregular enough (rubbelizing behavior) to suggest a large uncertainty in this toughness value. Crack interactions with the SiC particles, such as crack deflection and crack-wake bridging, were observed similar to that shown in FIG. 2.

The formation of SiC particles having a plate-like morphology in $MoSi_2$ from the displacement reaction between $Mo_2C$ and Si is quite extraordinary, particularly since the SiC volume fraction is nearly ideal for a whisker-reinforced composite. While the volume fraction can be estimated from the balanced reaction, the SiC morphology is difficult to predict with the available models and data. We expect the platelet size to depend on the reaction temperature, as for other discontinuous precipitation reactions (see Reference 17 above). In general, this control over the particle size is one of the strong points of displacement reaction synthesis of in situ composites. Comparison of the microstructure obtained here (FIG. 3) with that of the Martin Marietta XD™ process (see Reference 18 above) clearly shows that displacement reaction processing provides a more uniform dispersion of SiC in $MoSi_2$ and a more uniform size dispersion as well. The ability to control the size and morphology of the SiC particles, while not completely demonstrated here, gives displacement reaction processing important advantages over some of these other synthesis routes.

Figure 4:
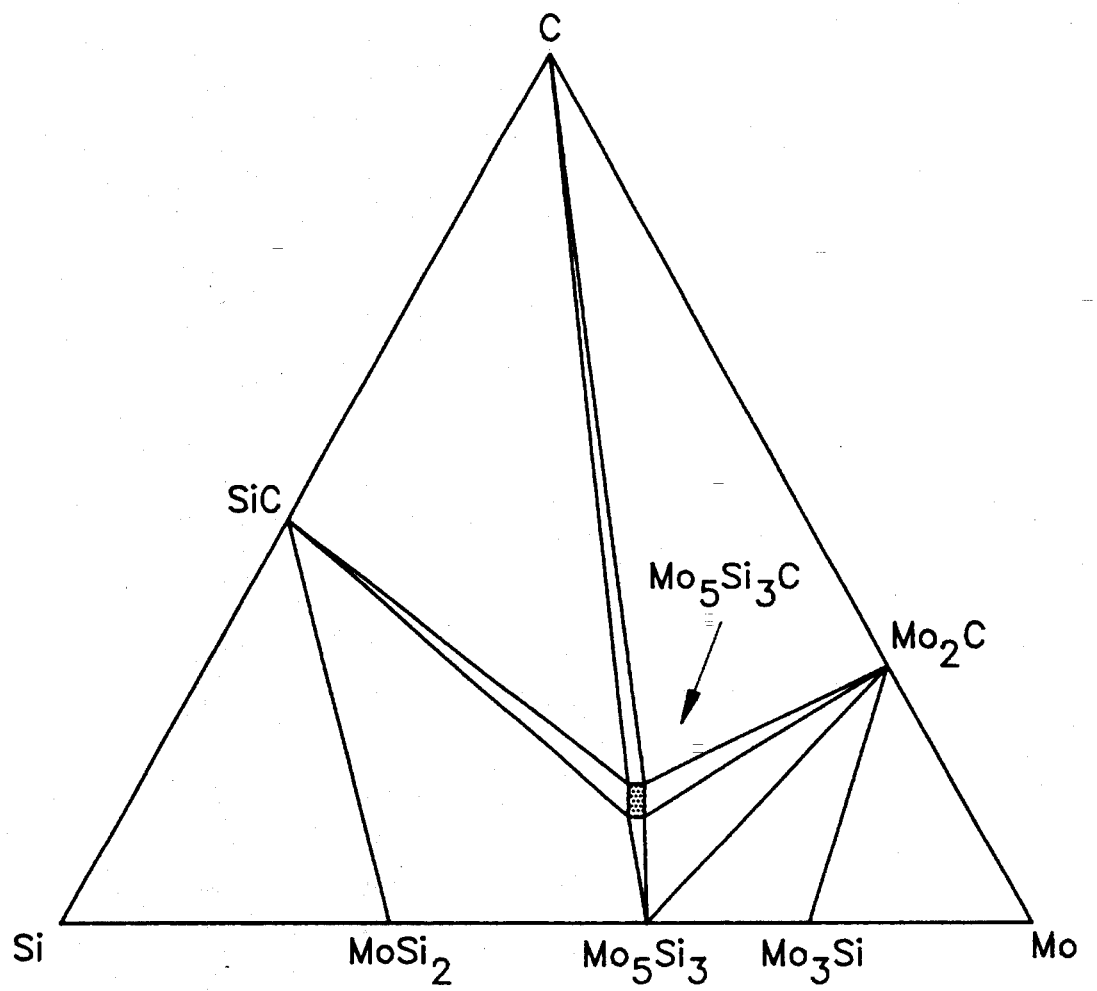
FIG. 4 is the 1200° C. cross section through the MoSiC phase diagram.

The alignment of the SiC platelets in the direction of diffusing species in the diffusion couple suggests a cooperative precipitation reaction and it is likely that SiC is being formed by the cooperative rejection of some species, probably carbon, during interdiffusion of Si and $Mo_2C$ to form $MoSi_2$. This view receives further support on examining the Mo—Si—C ternary phase diagram (see Reference 19 above), 1200° C. cross-section (FIG. 4). That work reports the formation of a ternary $Mo_5Si_3C$ phase formed from diffusion couples between Mo and SiC. A reaction pathway between $Mo_2C$ and Si would probably include the $Mo_2Si_3C$ phase, which could provide a source of carbon from the reaction $Mo_5Si_3C \rightarrow Mo_5Si_3+C$. Further interdiffusion of Si is suggested to result in the formation of SiC and $MoSi_2$.

The powder reaction during hot-pressing is expected to follow the same pathway, resulting in SiC platelets randomly oriented in the hot-pressed body following the reaction at 1350° C. The distinction is the further coarsening of the SiC after 1 hour at 1700° C. The SiC volume fraction and interparticle spacing appears to be similar for the diffusion couple and the hot pressed body. Observations of hot pressed bodies at 1350° C. without the 1700° C. densification step revealed that the reaction was completed in two hours at 1350° C., which is consistent with the short diffusion lengths in the blended powders. The presence of $Mo_5Si_3$ in the hot pressed material suggests that insufficient Si was used or that inadequate mixing occurred during powder blending.

The interaction of Knoop indentation cracks with the SiC platelets indicates that some measure of improved fracture toughness can be expected from these materials. Crack deflection along the $MoSi_2$/SiC interfaces means that this interface is weaker than the SiC particles which is required for crack-wake bridging and crack deflection processes to occur. The SEM observations do not show any indication of glassy phases at these boundaries (see Reference 20 above). The indentation fracture toughness of 8.7 MPa√m is consistent with that measured for SiC whisker-reinforced $MoSi_2$ (see Reference 20 above) but the indentation data obtained here, while indicative of increased toughness compared to monolithic $MoSi_2$, is clouded by the non-ideal Knoop cracking patterns observed.

Chevron-notched bend bars are being prepared from larger hot-pressings to obtain better data. Bend strength as a function of temperature will also be explored later using four point bend bars. It is anticipated that this composite will have excellent oxidation resistance based on the behavior of other $MoSi_2$/Sic composites (see Reference 18 above) and good creep strength based on the uniform dispersion of SiC particles.

The solid state displacement reaction between $Mo_2C$ and Si was used to synthesize a $MoSi_2$/SiC composite in situ. A diffusion couple processed at 1200° C. proceed SiC platelets in a $MoSi_2$ matrix. The SiC platelets had an areal fraction of about 30% and were nominally 1 μm wide and 10 μm long and were aligned in the direction the diffusion species. Cracks induced from Knoop indentations exhibited deflection along the MoSi$_2$/SiC interfaces and crack-wake binding was observed. Composites made by blending Si and Mo$_2$C powders and hot-pressing at 1350° C. for 2 hours followed by 1 hour at 1700° C. consisted of about 30 vol % SiC particles uniformly dispersed in a MoSi$_2$ matrix. The particles were about 1 μm in diameter and appeared to be spheroidized versions of the SiC platelets obtained at 1200° from the diffusion couples. The hot pressed material had a density of 5.53 g/cm$^3$ and an indentation fracture toughness of 8.7 MPa$\sqrt{m}$.

Composites were made by VHP of blended Si and Mo$_2$C powders at 1350° C. for 2 hrs. followed by densification at temperatures in the range of 1600° C. to 1800° C. undergo the following displacement reaction as determined by x-ray diffraction (XRD) and quantitative metallography:

VHP-1 and VHP-2: Mo$_2$C + 5Si ⟶ 2MoSi$_2$ + SiC + Mo$_5$Si$_3$C (trace)

VHP-1: 1700°C VHP-2: 1800° C.

This is the basic, stoichiometric reaction which, based on the presence of only a trace amount of the ternary Mo$_5$Si$_3$C phase, proceeds nearly to completion at 1600° C. The $\Delta G^{298}_{Total}$ for the above reaction is −310 kJ/mol and approximately 25% volume shrinkage occurs. Consideration of the ternary Mo—Si—C phase diagram and further analysis of diffusion couples between Mo$_2$C and Si indicate the following reaction sequence and characteristics: 1) Si is the fastest diffusing species and the ternary Mo$_5$Si$_3$C phase forms initially in the Mo$_2$C phase, followed by the MoSi$_2$ phase, 2) the SiC is observed to grow at the interface between the ternary Mo$_5$Si$_3$C phase and MoSi$_2$, but within the ternary phase, 3) the SiC growth direction is into the ternary phase, 4) the initial SiC morphology is plate-like with an aspect ratio of ~20, 5) the SiC plates undergo a Rayleigh instability and pinch-off into discrete particles approximately 1 μm in diameter at longer times, 6) the grain size of the MoSi$_2$ phase is less than 1 μm, and 7) the composites, after final consolidation, occupy compositions within a three-phase triangle given by MoSi$_2$—SiC—Mo$_5$Si$_3$C.

Two additional reactions were investigated by adding C powders to explore other compositions within the three-phase field:

VHP-3:   Mo$_2$C+5Si+0.3C→1.8MoSi$_2$+1.25SIC+0.05 Mo$_5$Si$_3$C

VHP-4:   Mo$_2$C+5Si+0.6C  Æ1.6MoSi$_2$+1.50SIC+0.1 Mo$_5$Si$_3$C

Adding C reduces the MoSi$_2$ grain size, increases the porosity for equal VHP times, and moves the final composition into the interior of the three-phase triangle towards C as expected. It is clear that other compositions within the triangle can be achieved by control of the relative amounts of Mo, Si, and C.

Processing by means of VHP of blended powders results in a dispersed-particulate phase composite due to the pinch-off instability of the SiC plates at 1600° C. to 1800° C. Representative polished cross-sections imaged by scanning electron microscopy (SEM) reveal the differences between the compositions and show the uniform dispersion of the three phases in the composites. Photomicrographs of fracture surfaces reveal the MoSi$_2$ grain size and show that the SiC particles lie mainly on the grain boundaries and at triple points. This suggests that the MoSi$_2$ grain size is controlled by the SiC volume fraction and spacing.

Mechanical properties (strength and toughness) of the composite materials as a function of temperature and composition suggest that both strength and toughness are highest for the material made by the above reaction consolidated at 1800° C. This material has the largest grain size, smallest volume fraction of SiC and Mo$_5$Si$_3$C, and least porosity. Adding C reduces both fracture strength and toughness, and does not increase elevated temperature strengths. An apparent ductile-brittle transition (DBT) occurs at about 1000° C. for all these materials. Above this DBT, with the exception of the material with the highest C-content and smallest grain size, the materials behave identically with respect to strength decrease as a function of test temperature, suggesting that strength above the DBT is controlled by deformation within the MoSi$_2$, which is the continuous phase. The fact that the DBT is ~1000° C. rather than 1300° C. is likely due to the fine grain size and increased contribution of grain boundary sliding to the deformation of the material.

Bend strength and chevron-notched fracture toughness were determined for all materials as a function of temperature in a self-aligning, SiC 4-point bend fixture having a 40 mm lower span and a 20 mm upper span. The specimen sizes were all 4 mm×4 mm×50 mm (nominal). The chevron notches were cut with a 60° included angle such that the tip of the chevron was approximately flush with the specimen surface. All chevron notches were measured after fracture testing, however, and a geometry factor was calculated for each specimen. In addition, chevron-notched specimens of AD995 alumina and Pyrex glass were tested at room temperature to calibrate the calculated geometry factor. Seven Pyrex specimens and 6 alumina specimens were tested, and the average fracture toughness values obtained were 0.81±0.11 MPa$\sqrt{m}$ and 3.73 ±0.12 MPa$\sqrt{m}$, respectively, using the appropriate calculated geometry factor $Y^*_{min}$. These values compare favorably with those reported in the literature.

All bend tests were conducted in air at a crosshead speed of 8.5×10$^{-4}$ mm/s in a MoSi$_2$-element vertical tube furnace. A SiC support tube held the bend fixture at the furnace mid-plane. Specimen deflections were measured at the mid-point of the bend bar by means of an alumina rod attached to a strain gage extensometer. All bend data were corrected for the fixture compliance.

The elevated temperature strength of the material with the highest C content suggests that deformation for this material above the DBT is controlled by a different process since the rate of strength decrease with temperature is lower. It may be that the MoSi$_2$ is no longer continuous given the higher volume fractions of SiC and Mo$_5$Si$_3$C. This should result in a material more resistant to deformation at elevated temperatures since SiC does not deform at 1000° C., but nothing is known of the mechanical properties of the Mo$_5$Si$_3$C phase.

The composite material's increased toughness, in comparison to pure MoSi$_2$ which has a toughness of about 3 to 5 MPa$\infty\sqrt{m}$, appears to originate with SiC-particle bridging in the crack wake and crack deflection at the SiC/MoSi$_2$ interfaces. The failure mode of the MoSi$_2$ phase appears to be transgranular cleavage at room temperature, and many examples of SiC particle pullout can be seen in the fractographs. The highest toughness would, therefore, be expected for the material with the largest volume fraction of SiC within the MoSi$_2$ grains, which would be the material with the largest grain size. It is encouraging that the fracture toughness is nominally equivalent to whisker- and particle-reinforced MoSi$_2$ materials, which suggests that in situ techniques can be used in place of expensive and hazardous whiskers to obtain significant property improvements.

A dispersion of SiC within MoSi$_2$ is produced wherein the SiC phase is not interconnected. Interdiffusion of Si into Mo$_2$C acts to destabilize planar growth interfaces to produce a dispersed structure. In the MoSi$_2$/SiC system, the true displacement reaction occurs between the ternary Mo$_5$Si$_3$C phase and the Si phase to form MoSi$_2$+SiC. The reaction between Si and Mo$_2$C to give Mo$_5$Si$_3$C will tend to produce a stable layer of Mo$_5$Si$_3$C, which is observed, because of the equilibrium join between the Mo$_2$C and Mo$_5$Si$_3$C. A layer of MoSi$_2$ is then observed to form between the Si and the Mo$_5$Si$_3$C phase, and the SiC then forms at the MoSi$_2$/Mo$_5$Si$_3$C interface within the Mo$_5$Si$_3$C phase. The SiC grows initially as platelets into the Mo$_5$Si$_3$C phase and is later entrained within the MoSi$_2$ phase as the Mo$_5$Si$_3$C decomposes into MoSi$_2$+SiC.

EXAMPLE 2

The solid state displacement reaction of Example 1 was repeated by heating the diffusion couple formed by equimolar amounts of pure Ni$_2$Al$_3$ and Ni$_4$O, in a molybdenum holder with Al$_2$O$_3$ spacers, at a vacuum of <1×10$^{-6}$ torr and at a 1200° C. for 16 hours. Expansion of the Al$_2$O$_3$ relative to the molybdenum provided a constant compression of the couple during the heating process. After heating, the couple was sectioned and the microstructure of the reaction zone was analyzed.

The reaction was determined to produce NiAl, Al$_2$O$_3$ and NiAl$_2$O$_4$. The final product was analyzed as described in Example 1. Analysis of the reaction zone between the NiO and the Ni—Al alloy revealed a pure nickel layer, an Al$_2$O$_3$ layer, and very large zone of NiAl with a dispersion of Al$_2$O$_3$ particles. Volume fraction of the oxide particles was approximately 25% in the middle of the reaction zone, but was less near the edge of the zone. It was determined that Al$_2$O$_3$ was dispersed in the NiAl phase.

EXAMPLE 3

Composites have also been synthesized by displacement reactions between NiAl and NiO powders to produce a composite material consisting of NiAl or NiAl+Ni$_3$Al+g–Ni and Al$_2$O$_3$. Powders of NiAl (d<45 μm, 99.5% purity) and NiO (d<45 μm, 99% purity) were blended for the VHP powder compacts. The powders were blended in 4:1 and 3:2 NiAl:NiO mol ratios in a vibratory ball mixer and hot-pressed at 27.5 MPa in graphite dies under a vacuum of about 10$^{-2}$ Pa. A hot-press die diameter of 7.62 cm was used with ~185 g of blended powders. A hot-pressing temperature of 1300° C. for 3 h was used for the NiAl-based VHP compacts.

In the Ni—Al/NiO system, the planar or layered interfaces are apparently stabilized during interdiffusion and the interconnected network of Al$_2$O$_3$ cells develop around the Ni—Al intermetallic regions. This is in accord with reaction products observed after diffusion took place at 1200° C. in a couple between NiO and Ni$_2$Al$_3$. The products consisted of discrete and stable layers of Ni/NiAl$_2$O$_4$/Al$_2$O$_3$/NiAl. It would be expected that any γ-Ni that formed during the reaction would be located at the Al$_2$O$_3$/NiAl interface.

Having described and illustrated the principles of the invention in a preferred embodiment thereof, it should be apparent that the invention can be modified in arrangement and detail without departing from such principles. I claim all modifications and variation coming within the spirit and scope of the following claims.

I claim:

1. A process for forming a noninterwoven dispersed particulate composite material, which comprises:

forming a multi-layer structure having a plurality of discrete layers comprising at least one discrete layer of a first reactant comprising a metalloid compound and at least one discrete layer of a second reactant comprising a metal compound, the discrete layers being arranged in alternating adjacent layers which are unreactive with each other at room temperature, and at least one of the first reactant and the second reactant having a composition including more than one chemical element; and heating the multi-layer structure to a temperature wherein interdiffusion between the first and second reactants is initiated, so that at least one element of the first reactant in one discrete layer and at least one element of the second reactant in an alternate adjacent discrete layer undergoes a solid state displacement reaction to form particles of a first reaction product and a second reaction product, the particles of the first reaction product being dispersed within a matrix of the second reaction product to produce said noninterwoven dispersed particulate composite product, wherein said first reactant is silicon, said second reactant is Mo$_2$C, said first reaction product is SiC and said second reaction product is MoSi$_2$.

2. The process of claim 1, wherein said solid state displacement reaction is:

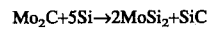

$$Mo_2C+5Si \rightarrow 2MoSi_2+SiC$$

3. The process of claim 1, wherein said first and second reactants are connected one with the other to form an interface therebetween, and a composite material comprising a first reaction product and a second reaction product are produced by diffusion bonding said first and second reactants at said interface.

4. The process of claim 3, wherein the solid state displacement reaction is conducted at a temperature of at least about 1000 degrees C.

5. The process of claim 1, wherein said particles of the first reaction product are platelets.

6. The process of claim 1, wherein said particles of the first reaction product are platelets.

7. The process of claim 1, wherein the first reactant and the second reactant are powders which are formed into said discrete layers.

8. A process for forming a nointerwoven dispersed particulate composite product, which comprises:

blending together a first reactant powder comprising a metalloid compound and a second reactant powder comprising a metal compound to form a blended reactant powder, the first and second reactant powders being unreactive with each other at room temperature, and at least one of the first reactant powder and the second reactant powder having a composition including more than one chemical element; and heating the blended reactant powder to a temperature wherein interdiffusion between the first and second reactant powders is initiated, so that at least one element of a first reactant powder and at least one element of a second reactant powder undergoes a solid state displacement reaction to form particles of a first reaction product and a second reaction product, the particles of the first reaction product being dispersed within a matrix of the second reaction product, to produce said noninterwoven dispersed particulate composite product;

wherein said first reactant powder is silicon, said second reactant powder is $Mo_2C$, and said first reaction product is SiC and said second reaction product is $MoSi_2$.

9. The process of claim 8, wherein said solid state displacement reaction is $$Mo_2C + 5Si \rightarrow 2MoSi_2 SiC$$

10. The process of claim 9, wherein the solid state displacement reaction is conducted at a temperature of at least about 1000 degrees C.

11. The process of claim 8, wherein said particles of the first reaction product are platelets.

12. The process of claim 8, wherein the particles of the first reaction product are distributed throughout the second reaction product.

13. The process of claim 8, wherein the particles of the first reaction product are uniformly distributed throughout the second reaction product.

14. The process of claim 8, wherein the particles of the first reaction product which are uniformly distributed throughout the second reaction product are platelets.

15. A process for forming a noninterwoven dispersed particulate composite material, which comprises:

forming a multi-layer structure having a plurality of discrete layers comprising alternating adjacent layers of a first reactant comprising a metalloid compound and a second reactant comprising a metal compound having a composition including more than one chemical element, which are unreactive with each other at room temperature; and heating the multi-layer structure to a temperature wherein interdiffusion between the first and second reactants is initiated, so that the first reactant in a discrete layer and at least one element of a second reactant in an alternate adjacent layer undergoes a solid state displacement reaction to form a composition including more than one chemical element, first reaction product and a composition including more than one chemical element, second reaction product in which particles of the first reaction product are dispersed within a matrix of the second reaction product, thereby producing said dispersed particulate composite product, wherein said first reactant is silicon, said second reactant is $Mo_2C$, said first reaction product is SiC and said second reaction product is $MoSi_2$.

16. The process of claim 15, wherein said solid state displacement reaction is:

$$Mo_2C + 5Si \rightarrow 2MoSi_2 + SiC$$

17. The process of claim 15, wherein the solid state displacement reaction is conducted at a temperature of at least about 1000 degrees C.

18. The process of claim 15, wherein said particles of the first reaction product are platelets.

19. The process of claim 15, wherein the particles of the first reaction product are distributed throughout the second reaction product.

20. The process of claim 15, wherein the particles of the first reaction product are uniformly distributed throughout the second reaction product.

21. The process of claim 20, wherein the particles of the first reaction product which are uniformly distributed throughout the second reaction product are platelets.

* * * * *